I. B. CONKLIN.
Seed-Sowers and Fertilizer-Distributors.
No. 151,652. Patented June 2, 1874.
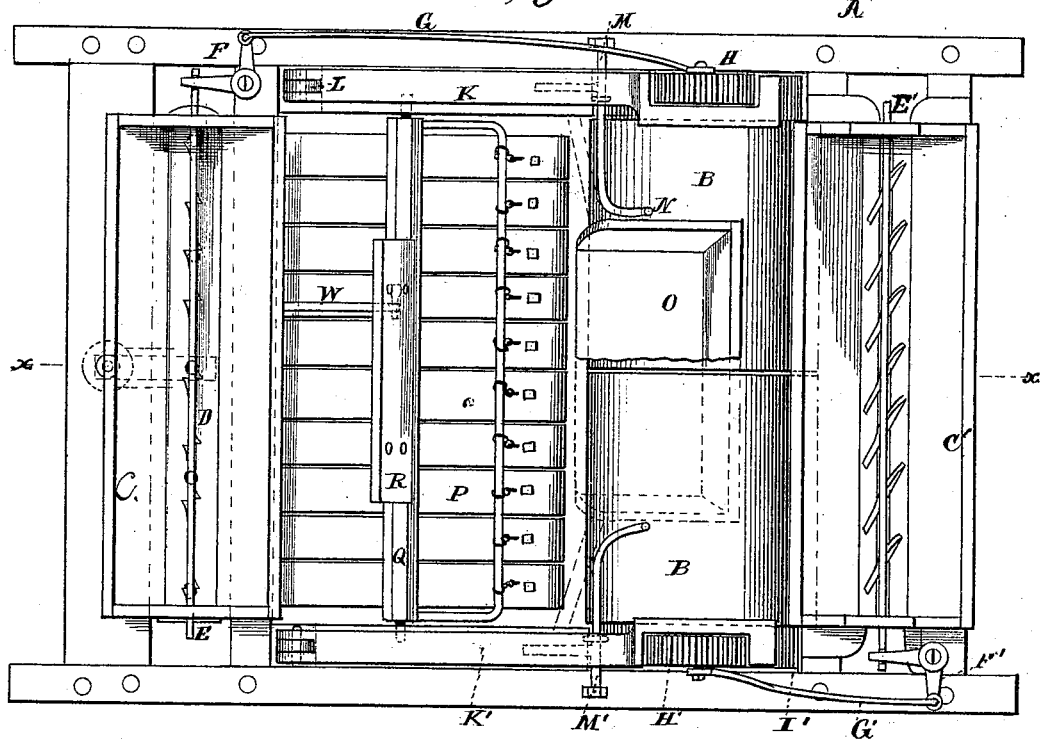
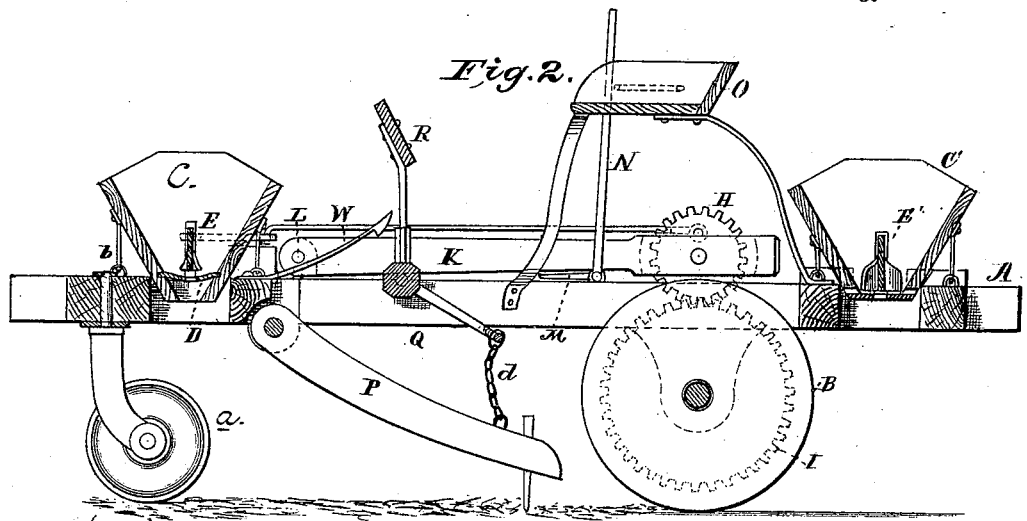

UNITED STATES PATENT OFFICE.

ISAIAH B. CONKLIN, OF PHILADELPHIA, PENNSYLVANIA.

IMPROVEMENT IN SEED-SOWERS AND FERTILIZER-DISTRIBUTERS.

Specification forming part of Letters Patent No. 151,652, dated June 2, 1874; application filed November 19, 1873.

*To all whom it may concern:*

Be it known that I, ISAIAH B. CONKLIN, of Philadelphia, in the county of Philadelphia and State of Pennsylvania, have invented certain new and useful Improvements in Seed-Sower and Fertilizer-Distributer, of which the following is a specification:

This invention has reference to a combined seed-sower, roller, and fertilizer-distributer, the component parts of which are so constructed and arranged that the various operations of sowing the seed and fertilizing substances, and rolling the ground, may be simultaneously performed, or the seed-sowing devices may be thrown out of gear and disconnected from the frame, and the fertilizing attachment only used in connection with the roller, or the latter may be used separately, as may be desired. The invention consists in arranging upon a frame, which is supported upon one or more ground-rollers, a pair of hoppers, located on both sides of the roller, and provided with agitating or seed and fertilizer distributing devices, which are operated through the medium of gearing, pitmen, and cranks from the shaft of the roller, the operative parts being so arranged that the seed-sowing or fertilizer-distributing devices, either or both, can be thrown out of gear from the driver's seat, for using the roller alone, or the seed-hopper may be detached, and the fertilizer-hopper transferred to its position, for sowing the fertilizing materials in advance of the roller, as will be hereinafter more fully described.

In the accompanying drawings, Figure 1 is a plan or top view of a combined seed-sower, fertilizer-distributer, and roller constructed according to my invention. Fig. 2 is a longitudinal sectional view of the same, taken through the line *x x* of Fig. 1.

The letter A designates the frame of the planter or drill, supported at its front end by a caster or guide-wheel, *a*, and having journaled in boxes near its rear end a ground-roller, B, which is made in sections, so as to facilitate the turning of the planter. At the forward end of the frame there is located a transverse hopper or seed-box, C, which is made generally with converging sides, and provided with a perforated bottom, D. The hopper is detachable, secured in position by means of a hook and staple, *b*, or other equivalent fastening-devices, and incloses a reciprocating bar or agitator-plate, E, which is provined with a serrated or winged lower edge, so as to push or press the seed through the openings in the bottom D. An alternate movement in opposite directions is imparted to the seed-distributing bar through the medium of an elbow or bell-crank lever, F, pivoted to a suitable support on the frame, and connected, through the medium of a pitman-rod, G, with a wrist-pin or a gear-wheel, H, meshing into a large spur-wheel, I, on the axle of the ground-roller. The gear-wheel H is journaled in the outer or free end of an arm or bar, K, which is pivoted or hinged to the frame at its forward end, as shown at L, so as to enable it to be raised for throwing the operative mechanism out of gear. The elevation or depression of said pivoted arm is effected through the medium of a crank or rock-shaft, M, passing beneath the same, and terminating in a vertical lever or handle, N, arranged in proper respect to the driver's seat O. The outer end of the seed-distributing bar is not attached to the bell-crank lever, but is simply provided with a notch in its upper edge for the reception of the bell-crank. This arrangement of parts will permit the seed-hopper to be readily detached whenever necessary for the purpose hereinafter stated. The drag-bars P, carrying drill-teeth for turning the seed under the ground, are arranged in rear of the seed-hopper, and are connected, by chains *d*, to a transverse rock-shaft, Q, which is adapted to be turned by a lever or movable foot-board, R, for raising or lowering the drill-teeth. The roller B follows in rear of the teeth, and rolls or presses the ground to cover the seed perfectly. In rear of the roller there is located a second hopper, C', which is designed for the reception of fertilizing materials, and is provided with devices for distributing the same alike in every respect with those employed for distributing the seed. E', in this instance, represents the winged distributing-bar; F', the bell-crank lever; G', the pitman or connecting-rod; K', the pivoted bar carrying the gear-wheel H', which meshes into the spur-wheel I' on the end of the ground-roller; and M', designates the crank-shaft for throwing the operative devices out of gear. A suitable locking device is applied to the driver's seat for retaining the lever on the crank or disengaging-shaft in position.

As above described, the machine is designed for sowing seed and fertilizers simultaneously, but when it is desired to distribute fertilizing materials separately this is readily accomplished by detaching the seed-hopper entirely from the frame and arranging the fertilizer-hopper in its place. The transposition is readily effected, as both hoppers are made detachable, and the connection with the operative devices is also rendered easy by simply inserting the elbow-lever into the notch in the distributing-bar. When both hoppers are in their respective positions on the frame, it is also an easy matter to throw out of action either the seed-distributing or fertilizing devices at the will of the operator or driver, as will be apparent.

If it is desired to use the roller independently of the distributing devices, both hoppers can be detached, or the gearing may be simply thrown out of gear. The drag-bars are, in this instance, held in an elevated position by a suitable catch, W, which is caused to engage with the treadle or foot board of the rock-shaft employed for raising the bars.

Having thus fully described my invention, what I claim as new is—

1. In a seeding and fertilizing machine supported upon a land-roller, the combination, with a frame having double supporting-bars for the hoppers, of pivoted pinion-bearings at each end of the roller, connecting-rods, and bell-cranks, for adapting the machine to be used interchangeably, as set forth.

2. In a seeding or fertilizing machine, the crank-gear H, pivoted bearing K, connecting-rod G, and bell-crank F, combined as shown, and for the purpose specified.

In testimony that I claim the foregoing I have hereunto set my hand this 14th day of November, 1873.

I. B. CONKLIN.

Witnesses:
  WM. J. PEYTON,
  A. H. NORRIS.